United States Patent
Atsumi

(10) Patent No.: US 8,979,176 B2
(45) Date of Patent: Mar. 17, 2015

(54) STEERING SUPPORT MEMBER

(71) Applicant: Suzuki Motor Corporation, Hamamatsu (JP)

(72) Inventor: Ryo Atsumi, Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 14/021,817

(22) Filed: Sep. 9, 2013

(65) Prior Publication Data

US 2014/0084629 A1  Mar. 27, 2014

(30) Foreign Application Priority Data

Sep. 21, 2012  (JP) ................. 2012-207789

(51) Int. Cl.
*B62D 25/14* (2006.01)
(52) U.S. Cl.
CPC .................... *B62D 25/145* (2013.01)
USPC ...................... 296/193.02; 296/72
(58) Field of Classification Search
CPC ...... B62D 25/14; B62D 25/145; B60K 37/02; B60K 37/06
USPC ............. 296/70, 72, 203.02, 193.02; 180/90
See application file for complete search history.

(56) References Cited

U.S. PATENT DOCUMENTS

| | | | |
|---|---|---|---|
| 5,580,122 A * | 12/1996 | Muehlhausen | 296/193.02 |
| 6,276,739 B1 * | 8/2001 | Wich | 296/72 |
| 6,851,742 B1 * | 2/2005 | Kubiak | 296/193.02 |
| 6,955,394 B1 * | 10/2005 | Reddig et al. | 296/208 |
| 7,284,789 B2 * | 10/2007 | Wolf | 296/208 |
| 7,571,956 B2 * | 8/2009 | Gunther et al. | 296/193.02 |
| 7,891,726 B2 * | 2/2011 | Gavrilov | 296/187.05 |
| 8,474,563 B2 * | 7/2013 | Naoi | 180/90 |
| 8,596,712 B2 * | 12/2013 | Miller et al. | 296/193.02 |
| 8,833,842 B2 * | 9/2014 | Naoi | 296/203.02 |
| 2003/0227195 A1 * | 12/2003 | Charbonnel | 296/208 |
| 2006/0283643 A1 * | 12/2006 | Simonds et al. | 180/90 |
| 2013/0057015 A1 * | 3/2013 | Allen | 296/70 |
| 2014/0084629 A1 * | 3/2014 | Atsumi | 296/193.02 |

FOREIGN PATENT DOCUMENTS

| | | |
|---|---|---|
| JP | 2006-160019 | 6/2006 |
| JP | 2007-506610 | 3/2007 |
| WO | 2005/028239 | 3/2005 |

* cited by examiner

*Primary Examiner* — Gregory Blankenship
(74) *Attorney, Agent, or Firm* — Silicon Valley Patent Group LLP

(57) ABSTRACT

A steering support member according to the present invention supports a steering shaft, extends in a vehicle width direction and is fixed at both ends to lateral sides of a vehicle, is molded of a light alloy or a resin composite material. And the steering support member includes a fixing portion having a shape of a truncated cone that extends toward a vehicle front side from the vicinity of a position supporting the steering shaft, a top of the fixing portion being fixed to a dash panel delimiting an engine room in a vehicle front portion, and a plurality of reinforcing ribs that are arranged upright along tangents to a circle constituted by the top of the fixing portion and to a bottom circle.

7 Claims, 7 Drawing Sheets

H–H

STEERING SUPPORT MEMBER

CROSS-REFERENCE TO RELATED APPLICATION

This application claims the benefit of and priority to Japanese Application No. 2012-207789 filed on Sep. 21, 2012 and entitled "Steering support member", which is assigned to the assignee hereof and which is incorporated herein by reference.

FIELD

This disclosure relates to a steering support member supporting a steering shaft and the like and extending in a vehicle width direction.

BACKGROUND

In a vehicle such as an automobile, a steering support member is arranged, for example, in a space partitioned with a dash panel and an instrument panel. The dash panel is a vehicle body panel that is located in a vehicle front portion and delimits an engine room from a vehicle compartment. The instrument panel is an interior component arranged on a compartment side of the dash panel.

The steering support member is a member that extends in a vehicle width direction and both ends of which are fixed to the lateral sides of the vehicle such as dash side panels, and that supports various kinds of components such as a steering mechanism. Therefore, strength and rigidity to support the weight of various kinds of components is required for the steering support member. "Steering mechanism" refers to components including a steering shaft, a steering wheel and the like.

If the rigidity of the steering support member is low, vibrations from the vehicle body (e.g., the suspension) or engine vibrations when idling are transmitted to the steering mechanism, and the so-called steering vibrations that make occupants feel uncomfortable may occur.

In recent years, there is a tendency to strive for weight reduction vehicles. Therefore, the use of materials that have excellent specific strength and specific rigidity, that is, light alloys for which magnesium alloy is a typical example and resin composite materials for which carbon fiber reinforced plastics (CFRP) are a typical example to make vehicle components is attracting attention.

Because these materials also have excellent moldability, they are expected to be used as materials for steering support members. Existing steering support members are, for example, made of iron and have the shape of a round bar.

On the other hand, an instrument panel support structure made of magnesium, which supports a control column (corresponding to a steering mechanism or the like), is described in Japanese Translation of PCT International Application Publication No. JP 2007-506610. A driver's seat side member molded in one piece of a magnesium alloy, which supports a steering mechanism, is described in Japanese Patent Laid-open Publication No. JP 2006-160019.

Because materials with excellent moldability are used for the structures or members described in Japanese Translation of PCT International Application Publication No. JP 2007-506610 and Japanese Patent Laid-open Publication No. JP 2006-160019, a longitudinal section of the steering support member along a vehicle front-rear direction has a U shape in which one side (e.g., a vehicle front side) is open, for example, to enhance the rigidity thereof or not to damage other surrounding components.

Sufficient strength and rigidity on the open side of the steering support member may not be obtained if a longitudinal section thereof has a U shape. To prevent this situation, it is conceivable to increase a wall thickness or to add other reinforcing components. However, this will make the steering support member heavy and make it difficult to reduce its weight.

In view of the foregoing problem, it is an object of the present invention to provide a steering support member that can achieve enhanced support strength and support rigidity while reducing the weight thereof.

SUMMARY OF THE DISCLOSURE

To achieve the object, a steering support member having a representative configuration according to the present invention is a steering support member that supports a steering shaft, that extends in a vehicle width direction and is fixed with both ends to lateral sides of a vehicle, and that is molded of a light alloy or a resin composite material, the steering support member comprising: a fixing portion having a shape of a truncated cone that extends toward a vehicle front side from the vicinity of a position supporting the steering shaft, a top of the fixing portion being fixed to a vehicle body panel delimiting an engine room in a vehicle front portion; and a plurality of reinforcing ribs that are arranged upright along tangents to circles constituted by the top, the bottom, or any section of the fixing portion.

Let us assume that a load is input from the vehicle body panels to the steering support member (or from the steering support member to the vehicle body panels). In this case, since the fixing portion has the shape of a truncated cone and no corners, the load is not skewed to a certain direction and concentrated. Therefore, the fixing portion can transmit the load in a well-balanced manner, regardless of the direction of the input load.

Because reinforcing ribs molded in one piece with the fixing portion are arranged upright along tangents to circles constituted by a top, a bottom, or any section of the fixing portion, the input load can be smoothly transmitted from the fixing portion to the reinforcing ribs. With the fixing portion and the reinforcing ribs molded in one piece as described above, it is possible to prevent a local concentration of the input load and consequently to enhance support strength and support rigidity of the steering support member. In addition, it is possible to suppress steering vibrations because the support rigidity of the steering support member is enhanced.

Moreover, because the steering support member is molded in one piece of a light alloy or a resin composite material, the weight and the number of components thereof can be reduced compared to existing steering support members made of iron. In addition, because light alloys or resin composite material have excellent moldability, it is possible to raise a degree of freedom with regard to the shape of the steering support member.

The plurality of the reinforcing ribs may be symmetrically arranged relative to a center line of the fixing portion extending in the vertical direction of the vehicle, and include: a pair of first reinforcing ribs extending in directions that are inclined with respect to each other and widen in either an upward or downward direction of the vehicle, and a pair of second reinforcing ribs extending in directions that are inclined with respect to each other and further widen in the same direction as the first reinforcing ribs widen in.

In this way, because the pair of the first reinforcing ribs and the pair of the second reinforcing ribs inclined in different directions are symmetrically arranged relative to a center line of the fixing portion, the propagation behavior of the input load can be easily analyzed. The analysis results of the propagation behavior of the load can be used to identify, for example, positions to be reinforced. The input load is efficiently dispersed by the reinforcing ribs arranged as described above, and it is possible to enhance the strength and rigidity of the steering support member.

The steering support member may be molded to provide its longitudinal section along a vehicle front-rear direction with a U shape, the U shape may include: a longitudinal wall, the fixing portion and the plurality of the reinforcing ribs being formed on the vehicle front side of the longitudinal wall, and an upper flange and a lower flange that project toward a vehicle front side from an upper and a lower end of the longitudinal wall respectively, the fixing portion and the plurality of the reinforcing ribs being arranged between the upper flange and the lower flange, the upper flange may include a projecting portion that projects toward the vehicle front side and is located above the fixing portion, further to the front than any other portions of the upper flange, and viewed from the vehicle front side, the projecting portion may form a triangular area together with the second reinforcing ribs.

Thus, a triangular area projecting toward the vehicle front side is formed in the steering support member. Forming the triangular area with the second reinforcing ribs and the projecting portion of the upper flange means that the second reinforcing ribs widen toward the upper side. Therefore, the open side of the U-shaped longitudinal section is supported by the triangular area in the steering support member. Although the rigidity of the open side of the U-shaped longitudinal section is low, it is possible to prevent the lowering of the rigidity of the open side because it is supported by the triangular area. The projecting portion is supported by the second reinforcing ribs constituting the triangular area. Therefore, the steering support member having the U-shaped longitudinal section is reinforced by the triangular area and is not deformed even if a load is input to the fixing portion.

The steering support member may further comprise: a mounting portion that is arranged inside or in the vicinity of the triangular area and on which the steering shaft can be mounted. Thus, the steering shaft is mounted on the firm mounting portion arranged inside or in the vicinity of the triangular area constituting a reinforcing structure. Consequently, it is possible to enhance support strength and support rigidity of the steering shaft, and to suppress steering vibrations.

The steering support member may further comprise: a pair of third reinforcing ribs that continuously extend from positions where the second reinforcing ribs contact the upper flange respectively, and repeatedly extend in a truss-like fashion in a vehicle width direction away from the fixing portion between the lower flange and the upper flange. Thus, the third reinforcing ribs continuously extend in a vehicle width direction while contacting the upper flange and the lower flange, and are linked together in a truss-like fashion. Consequently, the steering support member is reinforced across a vehicle width direction.

The steering support member may further comprising: a protrusion that is formed of part of the longitudinal wall protruding in a vehicle downward direction; wherein the protrusion includes: a pair of opposing flanges formed of the lower flange curving in a vehicle downward direction, and a fourth reinforcing rib that extends in a truss-like fashion in the vertical direction of the vehicle between the pair of the flanges. Therefore, the fourth reinforcing rib continuously extends in a vehicle downward direction while contacting a pair of flanges of the protrusion, and is linked together in a truss-like fashion. Consequently, the steering support member is also reinforced across a vehicle downward direction.

In accordance with the present invention, it is possible to provide a steering support member that can achieve enhanced support strength and support rigidity while reducing its weight.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Figure 1:
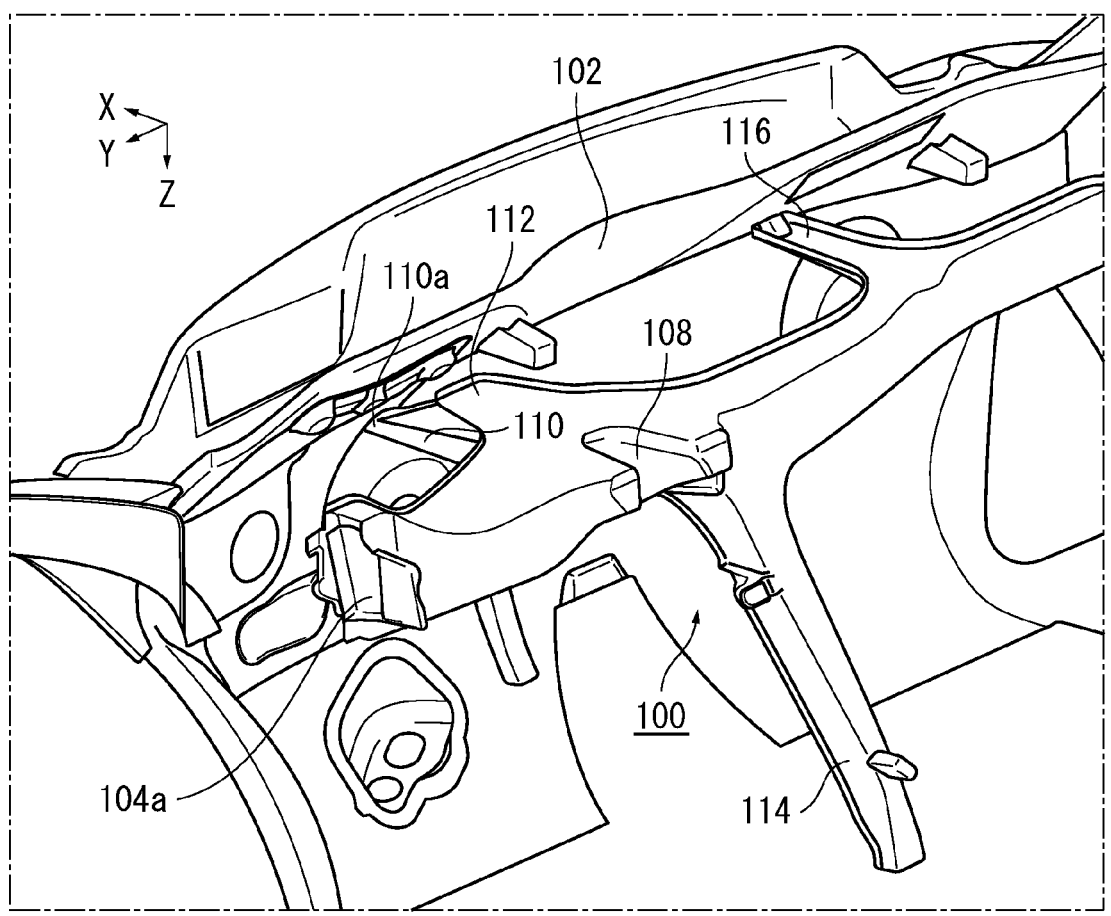
FIG. 1 is a diagram showing part of a vehicle with a steering support member according to an embodiment of the present invention.
Figure 2:
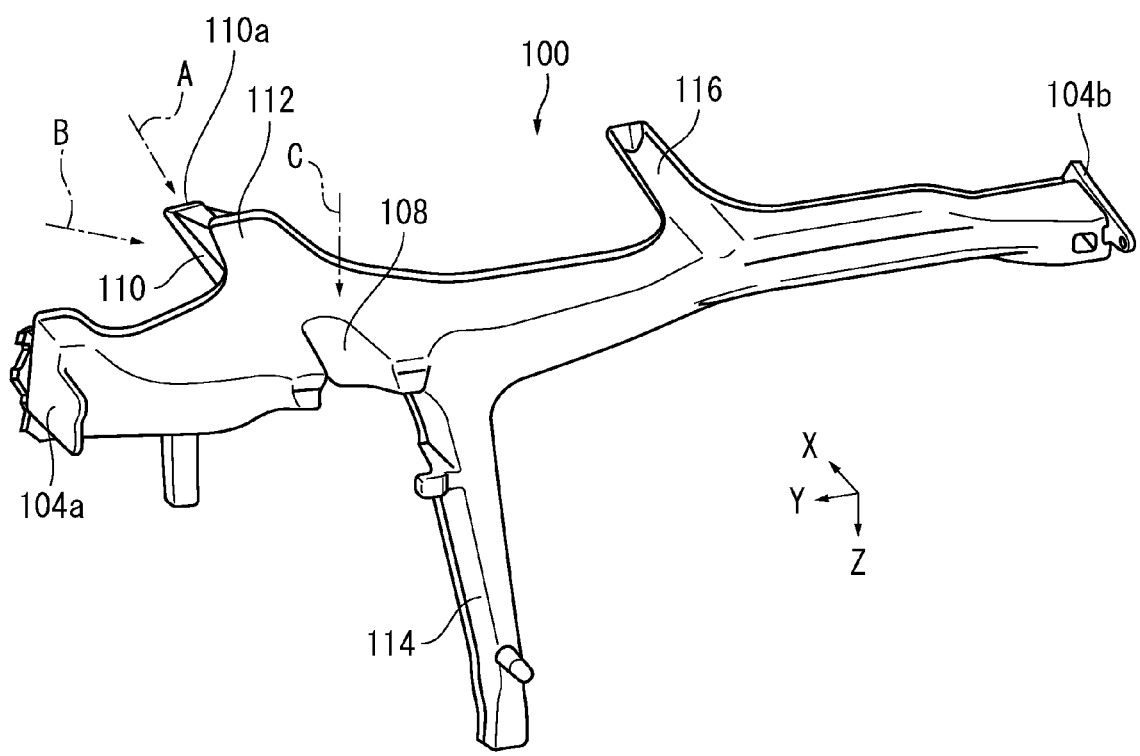
FIG. 2 is a diagram showing the overall steering support member shown in FIG. 1.

FIG. 1 is a diagram showing part of a vehicle with a steering support member according to the present embodiment. FIG. 2 is a diagram showing the overall steering support member shown in FIG. 1. In each diagram below, arrows X, Y, and Z indicate a direction toward a front side, a left side, and a bottom side of the vehicle respectively.

A steering support member 100 is arranged in a space partitioned with a dash panel 102 that is located in a vehicle front portion and that constitutes part of the vehicle as shown in FIG. 1, and an instrument panel (not shown). The dash panel 102 is a vehicle body panel that delimits an engine room in a vehicle front portion from a vehicle compartment. The instrument panel is an interior component arranged on the compartment side of the dash panel 102, and has a design surface viewed by occupants.

The steering support member 100 extends in a vehicle width direction and both ends 104a and 104b thereof (see FIG. 2) are fixed to dash side panels (not shown) constituting the lateral sides of the vehicle. The dash side panels are a pair of members supporting the dash panel 102 between them.

Figure 7:
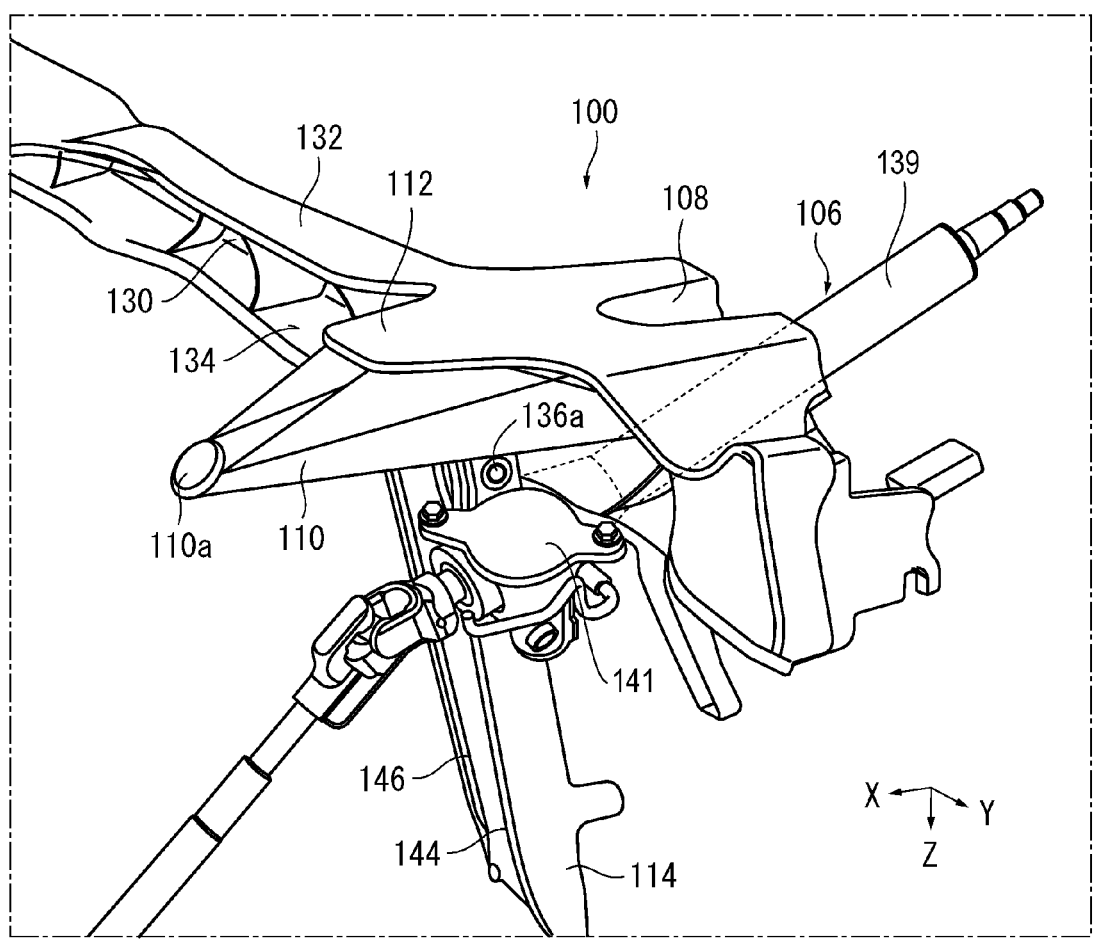
FIG. 7 is a diagram showing the steering support member according to the present embodiment on which a steering mechanism is mounted.

The steering support member 100 includes a steering mounting portion 108 supporting various kinds of components such as a steering mechanism 106 (not shown here, see FIG. 7). The steering mechanism 106 includes such components as a steering shaft and a steering wheel, for example. The steering mounting portion 108 is a depression that is recessed toward the vehicle front side as illustrated.

As shown in FIG. 1, the steering support member 100 has a fixing portion 110 that extends toward the dash panel 102 (i.e., toward the vehicle front side) from the vicinity of the steering mounting portion 108.

A top 110a of this fixing portion 110 is fixed by fastening or welding it to be fixed to the dash panel 102. The top 110a of the fixing portion 110 may be fixed to a vehicle body panel, which is not limited to the dash panel 102, located in the vehicle front portion, such as a cowl panel. Therefore, the load from the vehicle body panels or the steering mechanism 106 is input to the fixing portion 110 of the steering support member 100.

The steering support member 100 has a projecting portion 112 that is located above the fixing portion 110 and projects toward the vehicle front side, and a protrusion 114 that protrudes in a vehicle downward direction and is fastened to a vehicle body floor panel (not shown). An extension 116 extending toward the dash panel 102 is also formed in the steering support member 100.

Here, the steering support member 100 is molded of a light alloy such as aluminum or magnesium or a plastic composite material such as carbon fiber reinforced plastics (CFRP) or glass fiber reinforced plastics (GFRP) in order to reduce the weight of a vehicle. If a light alloy is used, it can be molded by die casting or injection molding, and if a plastic composite material is used, it can be molded by compression molding or injection molding, but there is not particular limitation to this. These raw materials are excellent in specific strength, specific rigidity, and moldability.

Because the steering support member 100 is molded in one piece of a light alloy or a resin composite material that has excellent moldability, it can have a complex shape. For example, the steering support member 100 may have not only a shape that can be fixed to the dash panel 102, the dash side panel, and the vehicle body floor panel as described above, or a shape further supporting the steering mechanism 106 described above, but also a shape that can be fastened to an instrument panel, a shape that can be mounted to components that are accommodated in the instrument panel, or a shape that can be fastened to other components as appropriate.

Figure 3:
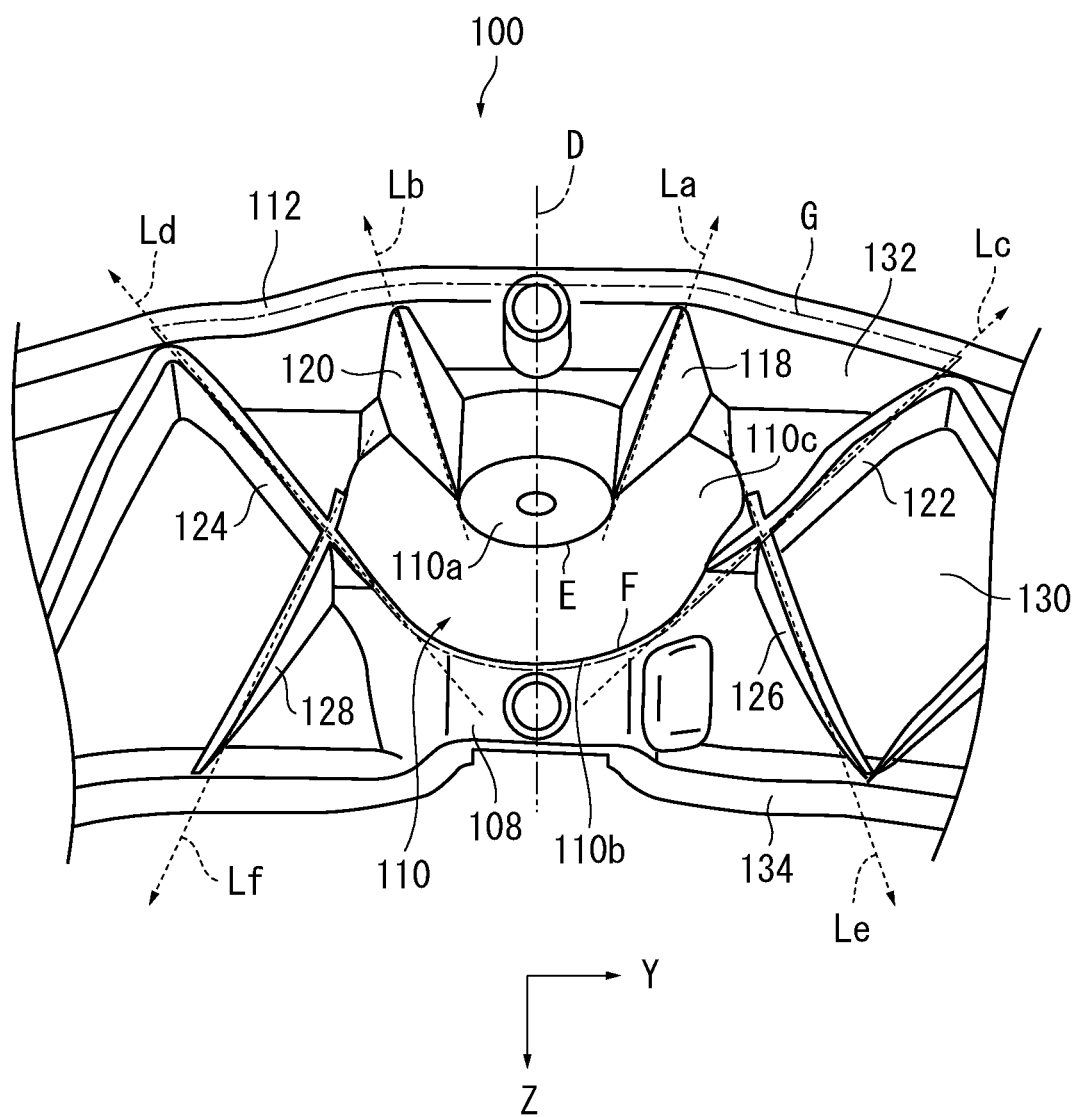
FIG. 3 is a view taken in the direction of arrow A of the steering support member shown in FIG. 2.
Figure 4A:
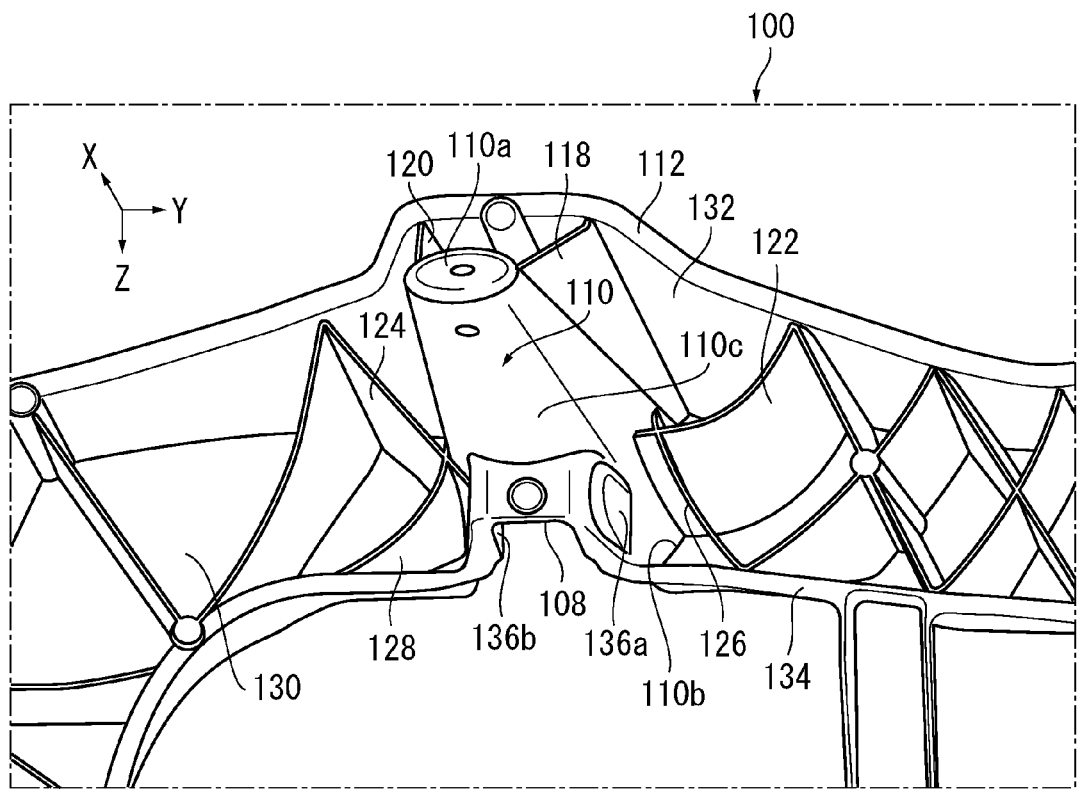
FIGS. 4A and 4B show views taken in the directions of arrow B and arrow C of the steering support member shown in FIG. 2.
Figure 4B:
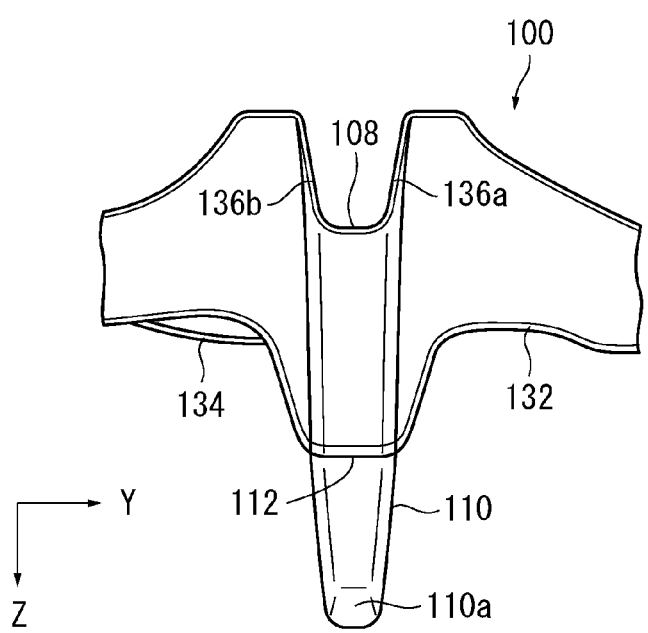

FIG. 3 is a view taken in the direction of arrow A of the steering support member 100 shown in FIG. 2. FIGS. 4A and 4B show views taken in the directions of arrow B and arrow C of the steering support member 100 shown in FIG. 2.

As shown in FIG. 3 and in a view taken in the direction of arrow B in FIG. 4A, the fixing portion 110 of the steering support member 100 has a shape of a truncated cone and includes the top 110a described above, a bottom 110b, and a side face 110c. The steering mounting portion 108 is formed in the vicinity of an underside of the side face 110c of the fixing portion 110.

As shown in FIG. 3, the steering support member 100 has a plurality of reinforcing ribs 118, 120, 122, 124, 126, and 128. A plurality of the reinforcing ribs 118, 120, 122, 124, 126, and 128 are symmetrically arranged relative to a center line D of the fixing portion 110, the center line D extending along the vertical direction of the vehicle. A pair of the reinforcing ribs 118 and 120 (first reinforcing ribs) is arranged upright along tangents La and Lb to a circle E constituted by the top 110a of the fixing portion 110. Therefore, ridge lines of the reinforcing ribs 118 and 120 extend along the tangents La and Lb. The two reinforcing ribs 118 and 120 extend in directions that are inclined with respect to each other and widen in a vehicle upward direction.

A pair of the reinforcing ribs 122 and 124 (second reinforcing ribs) is arranged upright along tangents Lc and Ld to a bottom circle F constituted by the bottom 110b of the fixing portion 110. Therefore, ridge lines of the reinforcing ribs 122 and 124 extend along the tangents Lc and Ld. The reinforcing ribs 122 and 124 extend in directions that are inclined with respect to each other and further widen in the same direction as the pair of reinforcing ribs 118 and 120 described above.

Moreover, a pair of the reinforcing ribs 126 and 128 is arranged upright along tangents Le and Lf to the bottom circle F. Therefore, ridge lines of the reinforcing ribs 126 and 128 extend along the tangents Le and Lf. The reinforcing ribs 126 and 128 extend in directions that are inclined with respect to each other and widen in a vehicle downward direction.

As shown in FIG. 4A, the steering support member 100 has a longitudinal wall 130, an upper flange 132, and a lower flange 134, and is molded to a U shape in which the vehicle front side is open. The longitudinal wall 130 extends from the bottom 110b of the fixing portion 110, for example, in the vertical direction of the vehicle, and the fixing portion 110 and the plurality of the reinforcing ribs 118, 120, 122, 124, 126, and 128 are formed on the vehicle front side thereof.

The upper flange 132 and the lower flange 134 are folded back and project toward the vehicle front side from the upper end and the lower end of the longitudinal wall 130 respectively, and the fixing portion 110 and the plurality of the reinforcing ribs 118, 120, 122, 124, 126, and 128 are arranged between them.

As shown in FIG. 4A and FIG. 4B, the upper flange 132 includes a projecting portion 112 that is located above the fixing portion 110 and project further toward the vehicle front side than any other portion of the upper flange 132. As shown in FIG. 3 and FIG. 4A, the pair of the reinforcing ribs 118 and 120 is arranged between the side face 110c extending from the top 110a to the bottom 110b of the fixing portion 110, the longitudinal wall 130, and the upper flange 132 including the projecting portion 112, and links them together.

As shown in FIG. 3 and FIG. 4A, the pair of the reinforcing ribs 122 and 124 is arranged between part of the side face 110c from the bottom 110b of the fixing portion 110, the longitudinal wall 130, and the upper flange 132 including the projecting portion 112, and links them together. As shown in FIG. 3, the pair of the reinforcing ribs 122 and 124 and the projecting portion 112 form a triangular area G shown with a dot-and-dash line in the figure as viewed from the vehicle front side.

This area G is an area projecting toward the vehicle front side because the projecting portion 112 is included in this area. The projecting portion 112 is supported by the pair of the reinforcing ribs 122 and 124 constituting the area G. As illustrated, the area G may include part of the bottom circle F of the fixing portion 110. Therefore, the steering support member 100, of which the open side on the vehicle front side of the U shape is supported by the triangular area G, is reinforced.

As shown in FIG. 3 and FIG. 4A, a pair of the reinforcing ribs is arranged between part of the side face 110c from the bottom 110b of the fixing portion 110, the longitudinal wall 130, and the lower flange 134, and links them together.

As shown in FIG. 3, the steering mounting portion 108 is arranged in the vicinity of the underside of the above-described area G constituting the reinforcing structure, that is, in a position having a high strength and rigidity. Therefore, the so-called steering vibrations can be suppressed by mounting the steering mechanism 106 on the steering mounting portion 108. The steering vibrations easily occur, for example, if support strength and support rigidity of the steering support member 100 are low, and occupants may feel uncomfortable due to rattling of the steering mechanism 106 during driving or propagation of the vibrations to the steering mechanism 106 through the vehicle body.

As shown in FIG. 4A and FIG. 4B, the steering mounting portion 108 is a depression that is recessed toward the vehicle front side, and has, for example, mounting points 136a and 136b opposing to each other. A bolt or the like inserted in the steering shaft is mounted on these mounting points 136a and 136b. In this way, the steering mechanism 106 is mounted on the steering mounting portion 108.

Figure 5:
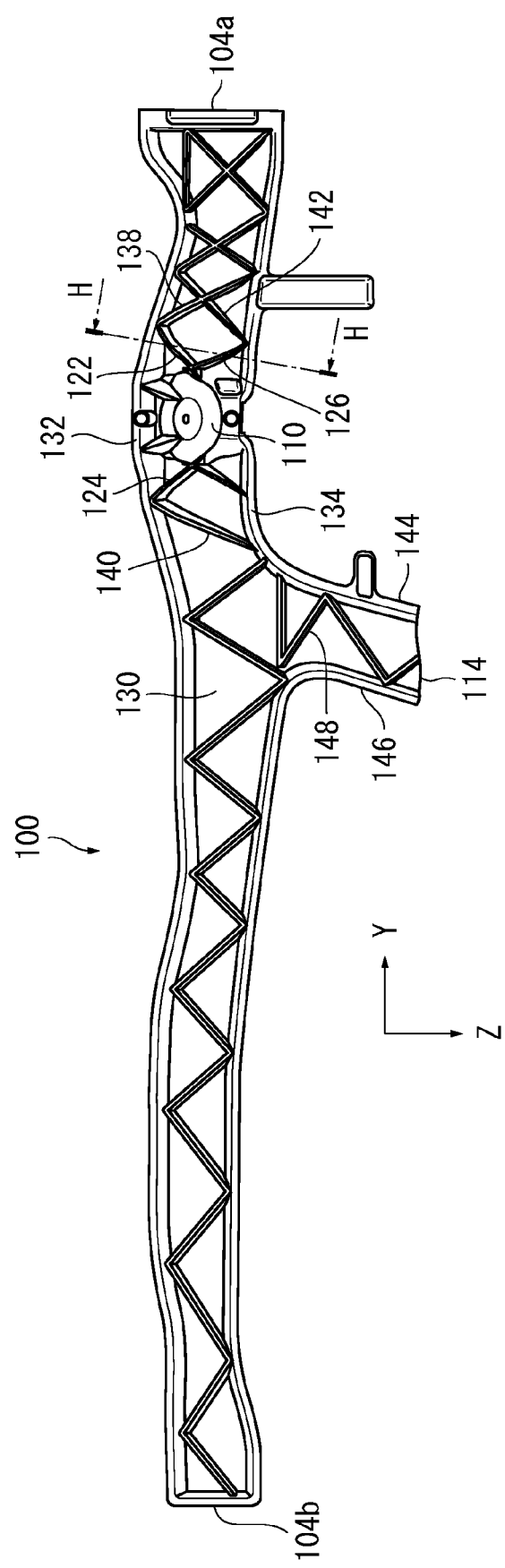
FIG. 5 is a diagram showing the steering support member shown in FIG. 2, as viewed from a vehicle front side.
Figure 6:
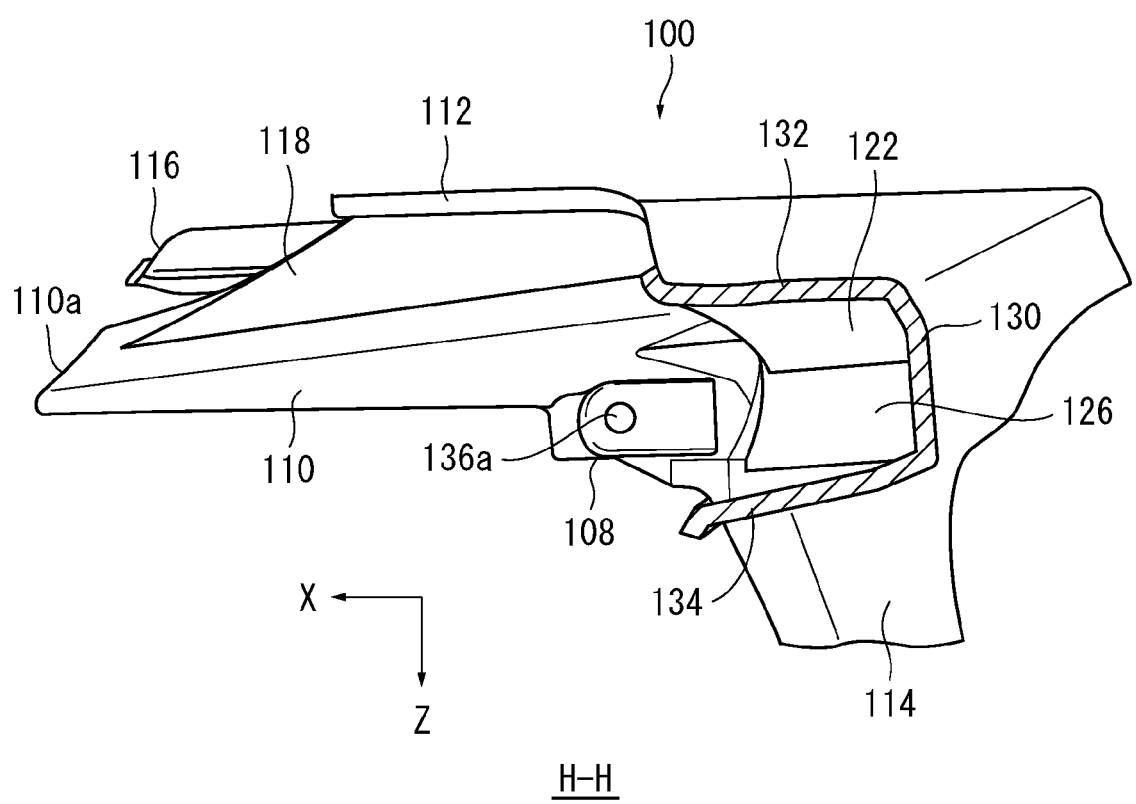
FIG. 6 is a cross-sectional view of the steering support member shown in FIG. 5.

FIG. 5 is a diagram showing the steering support member 100 shown in FIG. 2, as viewed from a vehicle front side. However, illustration of the extension 116 described above is omitted and only part of the protrusion 114 is illustrated in the figure. FIG. 6 is a cross-sectional view of the steering support member 100 shown in FIG. 5. In the figure, a cross-sectional view taken along the arrows H-H is illustrated and the extension 116 is also shown.

As shown in FIG. 5, the steering support member 100 includes a pair of reinforcing ribs 138 and 140 (third reinforcing ribs) continuously extending from the positions where the pair of the reinforcing ribs 122 and 124 described above contacts the upper flange 132 respectively. Pairs of the reinforcing ribs 138 and 140 repeatedly extend to both ends 104a and 104b in a truss-like fashion in a vehicle width direction away from the fixing portion 110 between the lower flange 134 and the upper flange 132.

Moreover, as shown in FIG. 5, the steering support member 100 has a reinforcing rib 142. The reinforcing rib 142 continuously extends from the position where the reinforcing rib 126 contacts the lower flange 134 and repeatedly extends to the end 104a in a truss-like fashion in a vehicle width direction away from the fixing portion 110.

Therefore, the steering support member 100 is reinforced with the reinforcing ribs 138 and 142 that are arranged, for example, in grid-like fashion between the lower flange 134 and the upper flange 132 on the left side of the fixing portion 110. In addition, the steering support member 100 is reinforced with the reinforcing rib 140 that repeatedly extends in a truss-like fashion to the end 104b in a vehicle width direction on the right side of the fixing portion 110.

As shown in FIG. 5 and FIG. 6, the protrusion 114 of the steering support member 100 is formed of part of the longitudinal wall 130 protruding in a vehicle downward direction. As shown in FIG. 5, the protrusion 114 includes a pair of flanges 144 and 146 opposing each other, which is formed of the lower flange 134 curving in a vehicle downward direction. Reinforcing ribs 148 (fourth reinforcing ribs) are arranged between the pair of flanges 144 and 146. The reinforcing ribs 148 repeatedly extend in a truss-like fashion, for example, while contacting the pair of flanges 144 and 146 in the vertical direction of the vehicle, and reinforce the protrusion 114.

Consequently, as shown in FIG. 5, the steering support member 100 is reinforced with the reinforcing ribs 138, 140, and 142 across a vehicle width direction and further with the reinforcing ribs 148 across a vehicle downward direction. Therefore, the steering support member 100 efficiently propagates, for example, a load input to the fixing portion 110 to the inside of the steering support member 100, and it is possible to enhance strength and rigidity thereof. Especially, because the pair of the reinforcing ribs 138 and 140 is arranged continuously from the pair of reinforcing ribs 122 and 124 that is arranged upright along the tangents Lc and Ld to the fixing portion 110, which has the shape of a truncated cone, it is possible to propagate the input load more efficiently.

Incidentally, as shown in FIG. 6, the cross-section of the steering support member 100 taken along the arrows H-H (longitudinal section), which is along a vehicle front-rear direction, has a U shape including the longitudinal wall 130, the upper flange 132, and the lower flange 134 described above, and generally, there is concern that the rigidity of the open side of the U shape on the vehicle front side is lowered. However, because the steering support member 100 is reinforced with the triangular area G described above (see FIG. 3), it is possible to prevent the lowering of rigidity of the open side of the U shape and the deformation thereof in a case that a load is input to the fixing portion 110.

Let us assume that a load is input from the dash panel 102 to the steering support member 100 (or from the steering support member 100 to the dash panel 102). In this case, because the fixing portion 110 has a shape of a truncated cone and no corners, the load is not skewed and concentrated in any particular direction. Therefore, it is possible to transmit the load in a well-balanced manner, regardless of the direction in which the load is input to the fixing portion 110.

Because the plurality of reinforcing ribs 118, 120, 122, 124, 126, and 128 is molded in one piece with the fixing portion 110 and arranged upright along the tangents La and Lb to the circle E constituted by the top 110a of the fixing portion 110, and the tangents Lc, Ld, Le, and Lf to the bottom circle F constituted by the bottom 110b respectively, the input load can be smoothly transmitted from the fixing portion 110 to the reinforcing ribs 118, 120, 122, 124, 126, and 128.

Therefore, with the fixing portion 110 and the reinforcing ribs 118, 120, 122, 124, 126, and 128 molded in one piece, it is possible to prevent a local concentration of the input load and consequently to enhance support strength and support rigidity of the steering support member 100. Because the input load is not concentrated locally in the steering support member 100, it is possible to efficiently disperse, for example, a load from the vehicle front portion to the vehicle lateral portion or the vehicle bottom portion.

FIG. 7 is a diagram showing the steering support member 100 according to the present embodiment on which a steering mechanism 106 is mounted. As shown in FIG. 7, a steering shaft 139 is mounted on the steering mounting portion 108 of the steering support member 100 in a diagonally downward direction toward the vehicle front side by using the mounting point 136a. As illustrated in the figure, the steering shaft 139 can be provided with an electric power motor 141, which is an optional component.

In this way, it is possible to suppress steering vibrations because support strength and support rigidity of the steering support member 100 are enhanced with the fixing portion 110 and the reinforcing ribs 118, 120, 122, 124, 126, and 128 as described above even if the steering support member 100 supports various kinds of heavy components.

Because the steering support member 100 is molded in one piece of a light alloy or a resin composite material with excellent moldability, it is possible to raise a degree of freedom with regard to its shape, and to reduce its weight and number of components compared to existing steering support members made of iron.

Moreover, because the plurality of pairs of reinforcing ribs 118, 120, 122, 124, 126, and 128 is symmetrically arranged relative to the center line D of the fixing portion 110, the propagation behavior of the input load can be easily analyzed. The analysis results of the propagation behavior of the load can be used to identify, for example, positions to be reinforced. The input load is equally and efficiently dispersed by arranging the plurality of the reinforcing ribs 118, 120, 122, 124, 126, and 128 symmetrically, and it is possible to enhance the strength and rigidity of the steering support member 100.

In the embodiment described above, the plurality of reinforcing ribs 118, 120, 122, 124, 126, and 128 is arranged upright along the tangents La and Lb to the circle E constituted by the top 110a of the fixing portion 110, and the tangents Lc, Ld, Le, and Lf to the bottom circle F constituted by the bottom 110b of the fixing portion 110 respectively, but there is no limitation to this. For example, reinforcing ribs may be arranged upright along a tangent to any circle that is a section between the top 110a and the bottom 110b of the fixing portion 110, which has the shape of a truncated cone. Although the plurality of reinforcing ribs 118, 120, 122, 124, 126, and 128 are symmetrically arranged relative to the center line D of the fixing portion 110, they may also be arranged non-symmetrically as long as they are arranged along tangents to circles as described above, and their number may be varied as appropriate. Moreover, for example, it is also possible that the pair of reinforcing ribs 118 and 120 extends in directions that are inclined with respect to each other and widen in a vehicle downward direction, arranging the plurality of the reinforcing ribs upright along tangents to the circles as described above.

The pair of the reinforcing ribs 122 and 124 constituting the triangular area G with the projecting portion 112 described above may also be arranged upright along other tangents than the tangents Lc and Ld. Thus, the steering mounting portion 108 may be arranged not in the vicinity of the triangular area G, but inside the area G, that is, in a position having higher strength and rigidity. In this case, it is possible to enhance support strength and support rigidity of the steering mechanism 106, and to further suppress the steering vibrations.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The present invention can be utilized in a steering support member supporting a steering shaft and the like and extending in a vehicle width direction.

The invention claimed is:

1. A steering support member that supports a steering shaft, that extends in a vehicle width direction and is fixed with both ends to lateral sides of a vehicle, and that is molded of an alloy or a resin composite material, the steering support member comprising:
a fixing portion having a shape of a truncated cone that extends toward a vehicle front side from a vicinity of a position supporting the steering shaft, a top of the fixing portion being fixed to a vehicle body panel delimiting an engine room in a vehicle front portion; and
a plurality of reinforcing ribs that are arranged upright along tangents to circles constituted by the top, a bottom, or any section of the fixing portion.

2. The steering support member according to claim 1, wherein the plurality of reinforcing ribs is symmetrically arranged relative to a center line of the fixing portion extending in a vertical direction of the vehicle, and includes:
a pair of first reinforcing ribs extending in directions that are inclined with respect to each other and widen in either an upward or downward direction of the vehicle; and
a pair of second reinforcing ribs extending in directions that are inclined with respect to each other and further widen in the same direction as the pair of first reinforcing ribs are widen in.

3. The steering support member according to claim 2, wherein the steering support member is molded to provide its longitudinal section along a vehicle front-rear direction with a U shape, and wherein the U shape includes:
a longitudinal wall, the fixing portion and the plurality of reinforcing ribs being formed on the vehicle front side of the longitudinal wall; and
an upper flange and a lower flange that project toward the vehicle front side from an upper and a lower end of the longitudinal wall respectively, the fixing portion and the plurality of reinforcing ribs being arranged between the upper flange and the lower flange;
wherein the upper flange includes a projecting portion that projects toward the vehicle front side and is located above the fixing portion, further to the front than any other portions of the upper flange; and
wherein when viewed from the vehicle front side, the projecting portion forms a triangular area together with the pair of second reinforcing ribs.

4. The steering support member according to claim 3, further comprising a mounting portion that is arranged inside or in a vicinity of the triangular area and on which the steering shaft can be mounted.

5. The steering support member according to claim 3, further comprising a pair of third reinforcing ribs that continuously extend from positions where the pair of second reinforcing ribs contact the upper flange respectively, and repeatedly extend in a truss-like fashion in the vehicle width direction away from the fixing portion between the lower flange and the upper flange.

6. The steering support member according to claim 4, further comprising a pair of third reinforcing ribs that continuously extend from positions where the pair of second reinforcing ribs contact the upper flange respectively, and repeatedly extend in a truss-like fashion in the vehicle width direction away from the fixing portion between the lower flange and the upper flange.

7. The steering support member according to claim 5, further comprising a protrusion that is formed of part of the longitudinal wall protruding in a vehicle downward direction, wherein the protrusion includes:
a pair of opposing flanges formed of the lower flange curving in the vehicle downward direction, and
a fourth reinforcing rib that extends in a truss-like fashion in the vertical direction of the vehicle between the pair of opposing flanges.

* * * * *